United States Patent [19]

Fujimoto et al.

[11] Patent Number: 5,065,853

[45] Date of Patent: Nov. 19, 1991

[54] LOCKUP CLUTCH OF TORQUE CONVERTER

[75] Inventors: Shinji Fujimoto; Mitsugu Yamaguchi, both of Neyagawa, Japan

[73] Assignee: Kabushiki Kaisha Daikin Seisakusho, Osaka, Japan

[21] Appl. No.: 644,862

[22] Filed: Jan. 23, 1991

Related U.S. Application Data

[63] Continuation of Ser. No. 393,917, Aug. 4, 1989.

[30] Foreign Application Priority Data

Dec. 28, 1987 [JP] Japan .................................. 62-336326

[51] Int. Cl.$^5$ ............................................ F16D 33/00
[52] U.S. Cl. ................................. 192/3.29; 192/3.21; 475/40
[58] Field of Search ................... 192/3.21, 3.28, 3.29; 475/40; 60/340, 364

[56] References Cited

U.S. PATENT DOCUMENTS

| | | | |
|---|---|---|---|
| 2,903,912 | 9/1959 | Edsall et al. | 475/40 |
| 2,987,940 | 6/1961 | Tuck et al. | 475/40 |
| 4,240,532 | 12/1980 | Blomquist | 192/106.2 |
| 4,512,212 | 4/1985 | Ishikawa | 192/3.31 |
| 4,890,706 | 1/1990 | Miura et al. | 192/3.28 |
| 4,903,803 | 2/1990 | Koshimo | 192/3.28 |

FOREIGN PATENT DOCUMENTS

| | | |
|---|---|---|
| 57-167559 | 10/1982 | Japan . |
| 61-28126 | 8/1986 | Japan . |
| 62-9051 | 1/1987 | Japan . |

Primary Examiner—Allan D. Herrmann
Assistant Examiner—Andrea Pitts
Attorney, Agent, or Firm—Armstrong, Nikaido, Marmelstein, Kubovcik & Murray

[57] ABSTRACT

A lockup clutch of torque converter comprising a front cover as an input part, an impeller linked to the outer circumference of the front cover, a second turbine disposed between the front cover and impeller in a position opposite to the impeller in the axial direction, a first turbine disposed between the impeller and the outer circumference of the second turbine, a stator disposed between the impeller and the inner circumference of the second turbine, a second turbine output part to which the inner circumference of the second turbine is linked, a power take-off support of the first turbine stretching outside the second turbine in the radial direction and between the second turbine and front cover, a first turbine output part to which the inner circumference of the support is linked, and a clutch disc disposed between the support and front cover, being linked to the inside of the front cover by friction, in which the output part of the clutch disc is formed by the folded part of the support.

2 Claims, 1 Drawing Sheet

LOCKUP CLUTCH OF TORQUE CONVERTER

This application is a continuation of application Ser. No. 393,917 filed Aug. 4, 1989.

BACKGROUND OF THE INVENTION

1. Field of the Invention

This invention relates to a lockup clutch to be used in a torque converter, and more particularly to a lockup clutch for use in a four-element (two-turbine) torque converter.

2. Description of the Prior Art

A torque converter comprising two turbines is disclosed in the U.S. Pat. No. 2,903,912. In this construction, a linking plate (support) for linking the outer circumference of the first turbine and its output hub is located between the shell and front cover (the input part of torque converter) of the second turbine. A lockup clutch is not disposed.

On the other hand, lockup clutches to be assembled into a torque converter having one turbine are disclosed in the U.S. Pat. No. 4,240,532 the Japanese Utility Model Publication No. 61-28126, the Japanese Utility Model Application No. 61-170593 and U.S. Pat. No. 4,903,803 corresponding thereto. The clutch disc of these lockup clutches is located between the turbine and the front cover.

According to the construction in the U.S. Pat. No. 4,240,532 or the Japanese Utility Model Publication No. 61-28126, the output member of the clutch disk is welded to the shell of the turbine. In the Japanese Utility Model Application No. 61-170593, the output member of the clutch disc is fixed to the hub which is an output part of the turbine.

By combining the above structures, when it is attempted to compose a four-element torque converter having a lockup clutch, the following problems are encountered.

That is, in any one of the above clutch discs, because an exclusive member is used as the output member, when such clutch disc is incorporated into a four-element torque converter having a large number of component parts, the total number of parts is further increased, the dimension becomes larger, and the assembling takes more time and labor.

SUMMARY OF THE INVENTION

To solve the above problems, the lockup clutch of this invention comprises a front cover as an input part, an impeller linked to the outer circumference of the front cover, a second turbine disposed between the front cover and impeller in a position opposite to the impeller in the axial direction, a first turbine disposed between the impeller and the outer circumference of the second turbine, a stator disposed between the impeller and the inner circumference of the second turbine, a second turbine output part to which the inner circumference of the second turbine is linked, a power take-off support of the first turbine stretching outside the second turbine in the radial direction and between the second turbine and front cover, a first turbine output part to which the inner circumference of the support is linked, and a clutch disc disposed between the support and front cover, being linked to the inside of the front cover by friction, in which the output part of the clutch disc is formed by the folded part of the support.

According to this construction, the torque transmitted to the first turbine from the front cover through the impeller and working fluid is further transmitted to the output part of the first turbine through the support. In the clutch connected state having the clutch disc linked to the front cover, the torque transmitted from the front cover to the clutch disc is transmitted to the output part of the first turbine through the support.

DESCRIPTION OF THE PREFERRED EMBODIMENT

Figure 1:
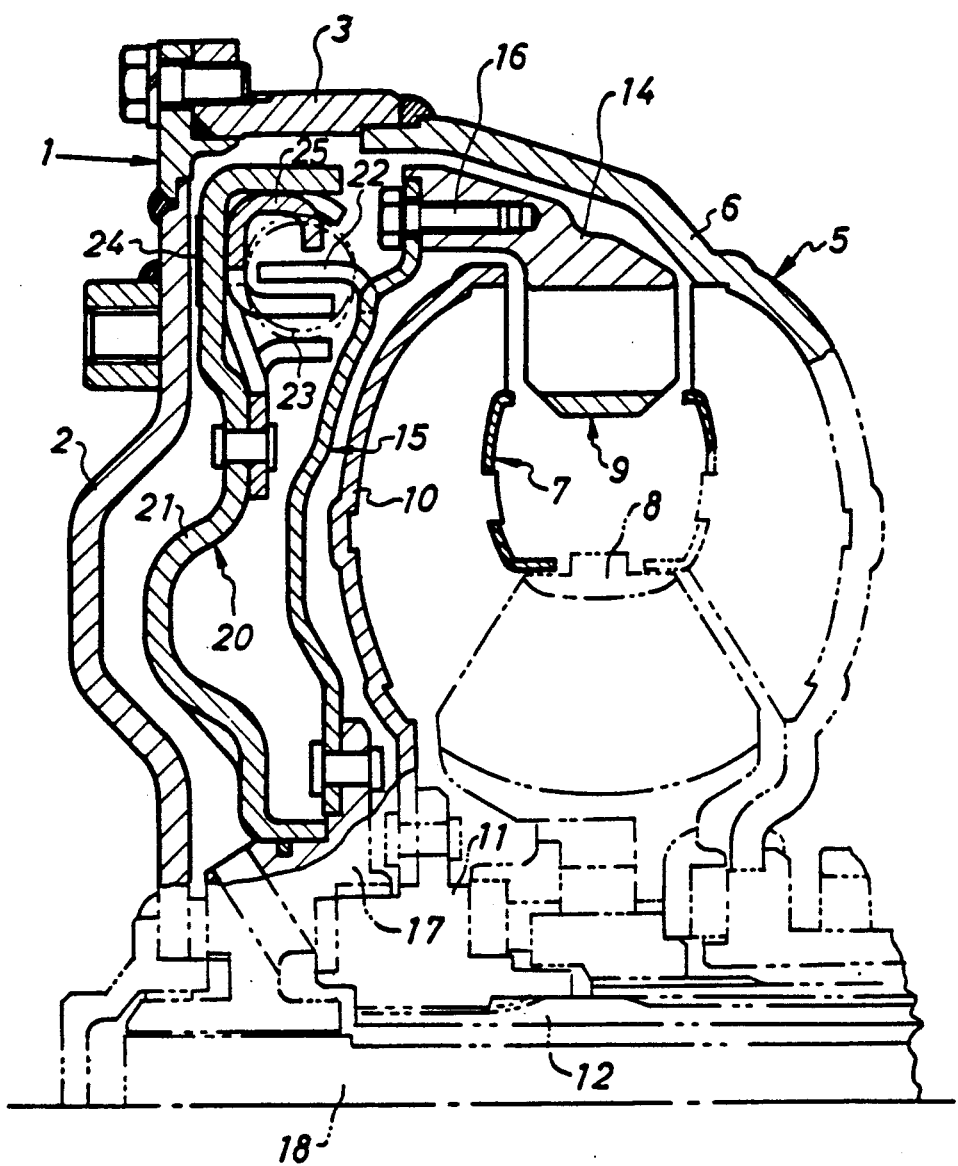
FIG. 1 is a partial sectional view of an embodiment of this invention.

In FIG. 1, a front cover assembly 1 which is an input part comprises a front cover 2 stretching approximately in the radial direction of the torque converter, and a tubular part 3 affixed on the outer circumference thereof, among others. At the front end of the tubular part 3, a shell 6 of an impeller 5 is fixed. A second turbine 7 is installed between the impeller 5 and the front cover 2. A stator 8 is provided between the inner circumference of the impeller 5 and the inner circumference of the second turbine 7. A first turbine 9 is installed between the outer circumference of the impeller 5 and the outer circumference of the second turbine 7.

A shell 10 of the second turbine 7 is affixed to a hub 11 (an output part) on its inner circumference. The hub 11 is linked to second output shaft 12.

The first turbine 9 has a boss 14 serving also as the shell disposed on the outer circumference. The boss 14 is stretched to the outside of the second turbine 7 in the radial direction, and the outer circumference of a support 15 is seated at its front end (the front cover 2 side face), and is fastened with bolt 16. The support 15 is stretched annularly between the second turbine shell 10 and front cover 2 almost along the shell 10, and its inner circumference is fixed to a hub 17. The hub 17 is linked to a first output shaft 18 which is coaxial with the second output shaft 12.

Between the shell 10 and front cover 2, a clutch disc 20 of lockup clutch is disposed. The clutch disc 20 is basically composed of a piston 21 as an input part, an output part 22, and plural coil springs 23 for linking the two (21, 22) in the rotating direction.

The piston 21 is an annular plate stretching nearly along the inside of the front cover 2, and a facing 24 for pressing to the inside of the front cover 2 is glued to its outer circumference, and its inner circumference is slidably fitted to the tubular outer circumference of the hub 17.

The plural coil springs 23 are disposed at intervals in the disc circumferential direction, and their outer periphery is held by a retaining plate 25. The retaining plate 25 is a folded plate fixed to the piston 21, and has a pawl which is engaged with each of coil spring 23 in the circumferential direction.

The output part 22 is formed integrally with the support 15, and more specifically it is formed by cutting and raising plural points at intervals in the circumferential direction on the outer periphery of the support 15, and folding in the axial direction and to the front cover 2 side. The output part 22 is engaged in the circumferential direction, same as the pawl of the retaining plate 25, with respect to the coil spring 23.

According to this structure, by moving the piston 21 by oil pressure, and pressing the facing 24 to the front cover 2, the lockup clutch is connected. In this state, the torque of the front cover is transmitted to the coil spring 23 from the piston 21 through the retaining plate 25, and is further transmitted to the support 15 main body from the coil spring 23 through the output part 22, and finally to the output shaft 18 from the support 15 through the hub 17.

As a matter of course, the torque transmitted from the front cover 2 to the impeller 5 is transmitted to the second turbine 7 and first turbine 9 through the working fluid. The torque transmitted to the second turbine 7 is transmitted from the hub 11 to the output shaft 12. The torque transmitted to the first turbine 9 is transmitted from the support 15 to the first output shaft 18 through the hub 17.

Thus, according to this invention, since the output part 22 of the clutch disc 20 is formed integrally with the support 15 which is a power take-off member of the first turbine 9, the number of parts is reduced and the structure may be simplified, and the entire structure may be reduced in while and the assembling work may be simplified.

What is claimed is:

1. A lockup clutch torque converter comprising a front cover as an input part, an impeller linked to an outer circumference of said front cover, a second turbine disposed between said front cover and impeller in a position opposite to said impeller in an axial direction of said torque converter, a first turbine disposed between said impeller and the outer circumference of said second turbine, a stator disposed between said impeller and an inner circumference of said second turbine, a second turbine output part to which the inner circumference of said second turbine is linked, a first turbine power take-off support stretching outside said second turbine in a radial direction of said torque converter and between said second turbine and said front cover, a first turbine output part to which the inner circumference of said support is linked, and a clutch disc slidably mounted on said first turbine output part and disposed between said support and said front cover, said clutch disc including a piston, a friction facing for linking said clutch disc to an inside of said front cover by friction and an output part on said support, said clutch disc including damper springs for linking said clutch and said output part on said support when said clutch is linked by friction to said front cover.

2. A lockup clutch torque converter according to claim 1, wherein said clutch disc comprises an input part for pressing against the inside of said front cover and a damper for linking said input part on said clutch disc and said output part on said support.

* * * * *